(12) United States Patent
Sato et al.

(10) Patent No.: US 6,723,184 B2
(45) Date of Patent: Apr. 20, 2004

(54) ALUMINUM ALLOY AND SLIDE BEARING

(75) Inventors: Kazuaki Sato, Toyota (JP); Yoshio Fuwa, Toyota (JP); Takashi Tomikawa, Toyota (JP); Shinichiro Sakamoto, Toyota (JP)

(73) Assignee: Taiho Kogyo Co., Ltd., Toyota (JP)

( * ) Notice: Subject to any disclaimer, the term of this patent is extended or adjusted under 35 U.S.C. 154(b) by 0 days.

(21) Appl. No.: 10/372,386

(22) Filed: Feb. 25, 2003

(65) Prior Publication Data

US 2003/0170470 A1 Sep. 11, 2003

(30) Foreign Application Priority Data

Mar. 5, 2002 (JP) ........................... 2002-059252

(51) Int. Cl.$^7$ ........................... C22C 21/00; B32B 15/08
(52) U.S. Cl. ........................... 148/438; 420/530; 428/457
(58) Field of Search ........................... 148/437, 438, 148/439, 440; 420/530; 428/457

(56) References Cited

U.S. PATENT DOCUMENTS 3,997,340 A * 12/1976 Sanders et al. ............. 148/439

FOREIGN PATENT DOCUMENTS

| JP | 56098586 A | * 8/1981 | ............ F04B/25/04 |
| JP | 57185950 A | * 11/1982 | ............ C22C/21/00 |
| JP | 2734891 | 4/1998 | |
| JP | 2000-144281 | 5/2000 | |
| SE | 8104315 A | * 11/1981 | ............ C22C/21/00 |

* cited by examiner

*Primary Examiner*—George Wyszomierski
*Assistant Examiner*—Janelle Combs Morillo
(74) *Attorney, Agent, or Firm*—Lowe Hauptman Gilman & Berner LLP

(57) ABSTRACT

An aluminum alloy which is able to use not only expensive TiC particles, but also inexpensive dispersed reinforcing particles and which is further raised in high temperature strength without requiring an increase in dispersed reinforcing particles, comprised of Sn: 2 to 20 wt %, Cu: 0.1 to 3 wt %, Ca: 0.02 to 1.5 wt %, at least one element selected from the group comprised of Mg, Cr, Zr, Mn, V, Ni, and Fe: not more than 2 wt % in total, at least one type of reinforcing particle selected from the group comprised of TiC particles, ZrC particles, and Al$_2$O$_3$ particles: 0.1 to 5 vol % in total, and the balance of Al and unavoidable impurities; a slide bearing comprised of that aluminum alloy; and a slide bearing comprised of a bearing body made of that aluminum alloy provided on its surface with a resin coating layer comprised of a heat-curing resin and a solid lubricant.

3 Claims, 4 Drawing Sheets

ALUMINUM ALLOY AND SLIDE BEARING

BACKGROUND OF THE INVENTION

1. Field of the Invention

The present invention relates to an aluminum alloy and a slide bearing.

2. Description of the Related Art

In high speed and high contact pressure applications of slide bearings, in particular bearings for internal combustion engines (control rod bearings), the high temperature strength must be raised to secure fatigue strength at high temperatures. Simultaneously, the room temperature strength must be lowered to secure conformability at room temperature. It is impossible however in practice to simultaneously satisfy the required high temperature high strength and room temperature low strength with a single material.

Therefore, in the past, the practice has been to fabricate the bearing body by the good high temperature strength Kelmet (Cu-20 to 45PB) to secure the overall high temperature strength and cover the bearing part with Pb to secure the conformability at room temperature.

On the other hand, the assignee, as disclosed in Japanese Patent Application No. 2001-110347, previously developed an aluminum alloy containing 2 to 20 wt % of Sn, 0.1 to 3 wt % of Cu, 0.1 to 4.5 vol % of TiC having an average particle size of not more than 0.2 μm, and the balance of Al and unavoidable impurities. This alloy secured room temperature low strength (conformability) by the Sn and simultaneously secured high temperature high strength (high temperature fatigue strength) by the Cu and TiC particles and could give extremely superior properties when used for a slide bearing.

The above alloy, however, was limited in the following respects from the viewpoint of the achievement of high temperature high strength:

(1) The scope of application was limited to a very narrow range of models of vehicles etc. It was possible to increase the high temperature strength by increasing the amount of TiC particles, but the room temperature strength simultaneously became higher, so the conformability dropped and seizure ended up occurring. Therefore, a new means enabling the high temperature strength to be raised while keeping down the rise in room temperature strength without increasing the amount of TiC particles is required.

(2) TiC particles are expensive, so a rise in cost is unavoidable. To obtain high temperature high strength, the dispersed reinforcing particles have to be on average not more than 0.2 μm or extremely fine. Production of such fine particles requires in-situ production. ("in-situ production" includes the method based on slow temperature rise and high temperature soaking disclosed by the assignee in Japanese Patent No. 2734891, the method based on rapid temperature rise and self generation of heat disclosed by the assignee in Japanese Unexamined Patent Publication (Kokai) No. 2000-144281, etc.) Even in that case, production of fine particles can be achieved in the above way only for TiC. Therefore, a new means able to be applied to dispersed reinforcing particles other than TiC so as to raise the high temperature strength without requiring the dispersed reinforcing particles to be made finer in the above way is required.

SUMMARY OF THE INVENTION

An object of the present invention is to provide an aluminum alloy which is able to use not only expensive TiC particles, but also inexpensive dispersed reinforcing particles and which is further raised in high temperature strength without requiring an increase in the amount of dispersed reinforcing particles and a slide bearing using that alloy.

To attain the above object, according to a first aspect of the present invention, there is provided an aluminum alloy comprised of:

Sn: 2 to 20 wt %,

Cu: 0.1 to 3 wt %,

Ca: 0.02 to 1.5 wt %, at least one element selected from the group comprised of Mg, Cr, Zr, Mn, V, Ni, and Fe: not more than 2 wt % in total, at least one type of reinforcing particle selected from the group comprised of TiC particles, ZrC particles, and $Al_2O_3$ particles: 0.1 to 5 vol % in total, and the balance of Al and unavoidable impurities.

According to a second aspect of the present invention, there is provided a slide bearing comprised of the above aluminum alloy of the present invention The present inventors discovered that by the addition of a suitable amount of Ca in particular, even if using ZrC particles or $Al_2O_3$ particles, not just TiC particles, it is possible to increase the strength without increasing the amount of reinforcing particles. That is, according to the present invention, it is possible to raise the high temperature strength without causing a deterioration in the conformability due to the increased amount of reinforcing particles.

According to a third aspect of the present invention, there is provided a slide bearing comprised of a bearing body made of the aluminum alloy of the present invention provided on its surface with a resin coating layer, wherein the resin coating layer contains 70 to 30 vol % of a soft, good high temperature elongation heat-curing resin having properties at 25° C. of a tensile strength of 70 to 110 MPa and an elongation of 7 to 20% and properties at 200° C. of a tensile strength of at least 15 MPa and an elongation of at least 20% and 30 to 70 vol % of a solid lubricant (here, the total of the two being 100 vol %) and wherein the Vicker's hardness Hv of the resin coating layer is not more than 20.

The above resin coating layer is disclosed by the present assignee in Japanese Patent Application No. 2000-246354. By bonding the solid lubricant with the soft, good high temperature elongation heat-curing resin, the conformability and heat resistance are secured without peeling as in the past.

By providing this resin coating layer at the surface of the bearing body comprised of the aluminum alloy of the present invention, it is possible to further improve the conformability and possible to expand the scope of application in models of vehicles etc.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
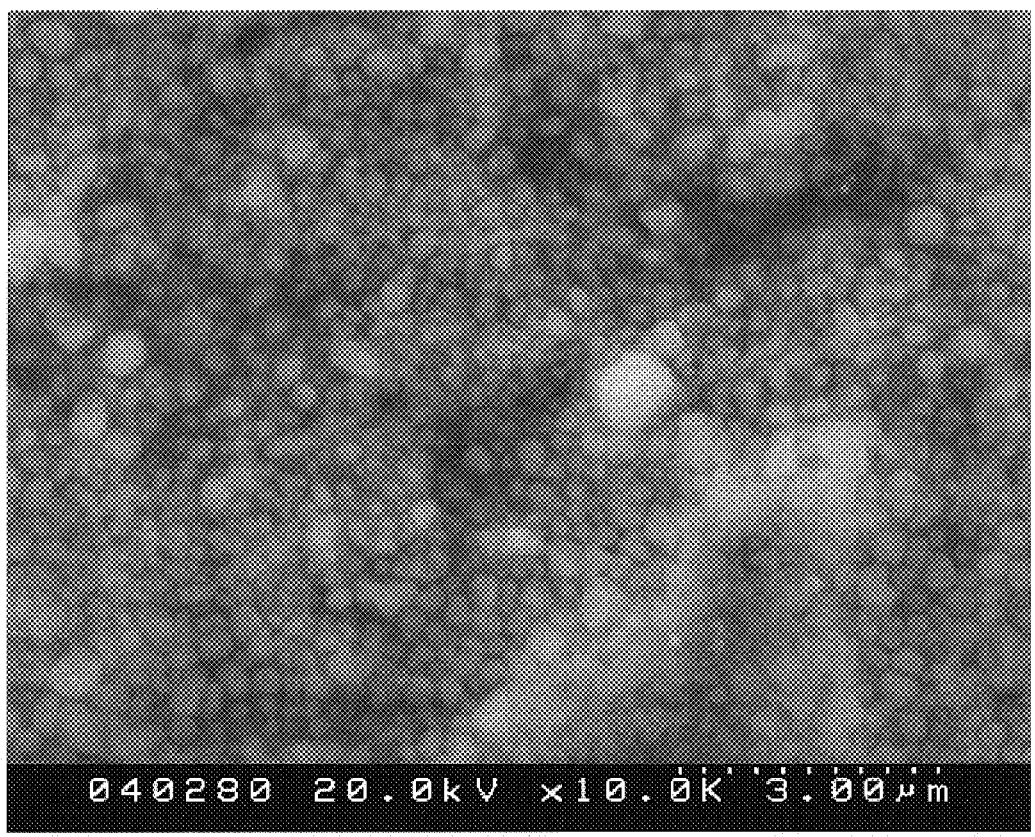
FIG. 1 is a scan electron micrograph of a TiC master alloy in the case of in-situ production of TiC particles for introduction into the aluminum alloy of the present invention.

Preferred embodiments of the present invention will be described in detail below while referring to the attached figures.

In the aluminum alloy of the present invention, the reasons for limitation of the ingredients were as follows:

(Sn: 2 to 20 wt %)

Sn is an element dispersing as a soft phase in the Al matrix to contribute to securing room temperature low strength and imparts conformability in the case of application to a slide bearing. If the amount of Sn is less than 2 wt %, the room temperature low strength is insufficiently secured, while if over 20 wt %, the strength of the aluminum alloy falls. Therefore, the amount of Sn has to be 2 to 20 wt %. The preferable amount of Sn is 2 to 12 wt %, while the more preferable amount of Sn is 2 to 8 wt %.

(Cu: 0.1 to 3 wt %)

Cu reinforces the Al matrix by solid solution hardening and improves the fatigue resistance at room temperature and high temperatures. To obtain this effect, the amount of Cu must be made at least 0.1 wt %. If the amount of Cu is over 3 wt %, however, the room temperature strength becomes too high and the room temperature low strength as represented by the conformability of a slide bearing cannot be obtained. The preferable range of amount of Cu is 0.1 to 2 wt %.

(Ca: 0.02 to 1.5 wt %)

Ca, in the copresence of one of more reinforcing particles of TiC particles, ZrC particles, and $Al_2O_3$ particles, cleanses the surface of the reinforcing particles and, by reaction with the surface of the reinforcing particles, raises the wettability between the reinforcing particles and the aluminum alloy melt to improve the dispersion and promote the dispersion strengthening of the final aluminum alloy.

To obtain this effect, the Ca must be contained in an amount of least 0.02 wt %. If the content of Ca is more than 1.5 wt %, however, compounds such as $Al_4Ca$ will precipitate and conversely the strength will drop. Therefore, to obtain the reinforcing action due to the addition of Ca, the content of Ca must be kept in the range of 0.2 to 1.5 wt %. Preferably, the Ca content is in the range of 0.2 to 1 wt %, more preferably the Ca content is 0.05 to 0.2 wt %.

(At least one element selected from the group comprising Mg, Cr, Zr, Mn, V, Ni, and Fe: not more than 2 wt % in total)

Mg strengthens the Al matrix by solid solution hardening). If the content is over 2 wt %, the strength becomes too high, the room temperature low strength cannot be secured, and the conformability at the time of application to a slide bearing falls. Cr, Zr, Mn, V, Ni, and Fe improve the high temperature strength. If the content is more than 2 wt % in total, the strength becomes too high and simultaneously rough precipitate will be produced making room temperature low strength hard to secure and causing the conformability at the time of application to a slide bearing to fall. The preferable amount of addition of any of the above ingredients is a total of 0.3 to 1.5 wt %.

(At least one reinforcing particle selected from the group comprised of TiC particles, ZrC particles, and $Al_2O_3$ particles: 0.1 to 5 vol %)

To obtain the reinforcing effect of dispersion strengthening by the above reinforcing particles, the content of the reinforcing particles must be at least 0.1 vol % in total. If the content is over 5 vol % in total, the improvement of the room temperature strength becomes too great compared with the improvement of the high temperature strength and the two cannot be simultaneously achieved. Therefore, the content of the reinforcing particles is made a range of 0.1 to 5 vol % in total.

Note that the particle size of the reinforcing particles is not particularly limited so long as it gives the action of dispersion strengthening. It may be suitably selected in accordance with the required characteristics etc. As a typical example, the particle size of the reinforcing particles as produced by the above-mentioned in-situ production is the submicron size (not more than 1 $\mu$m) for the TiC particles and ZrC particles and several $\mu$m or so for $Al_2O_3$ particles.

The aluminum alloy of the present invention may be provided with both room temperature low strength and high temperature high strength without the addition of Pb as an alloy ingredient. In this respect, it is extremely advantageous, from the viewpoint of environmental protection as well, for existing slide bearings comprised of the Cu—Pb alloy Kelmet covered with Pb. Therefore, in the alloy of the present invention as well, it is preferable to give consideration to the strict selection of the materials of the ingredients to reduce the level of content of Pb as an impurity.

A typical process for production of the aluminum alloy of the present invention will be explained below with reference to the case of use of TiC as the reinforcing particles.

First, an Al—Sn, Al—Cu, or other Al alloy and pure Al or other metal materials (hereinafter called "Al master alloy") and a compressed powder shaped article of the above Al alloy or pure Al with TiC particles dispersed therein (hereinafter referred to as the "TiC master alloy") are prepared so that the overall composition of the two combined becomes the composition of the final aluminum alloy. The contents of Mg, Cr, Zn, Mn, V, Ni, and Fe are similarly adjusted in the aluminum master alloy.

Here, the TiC master alloy is prepared by in-situ production in the powder shaped article including the Al, Ti, and C. Specifically, it is possible to use the method based on slow temperature rise and high temperature soaking disclosed by the assignee in Japanese Patent No. 2734891, the method based on rapid temperature rise and self generation of heat disclosed by the assignee in Japanese Unexamined Patent Publication (Kokai) No. 2000-144281, etc.

For example, with the former method based on slow temperature rise and high temperature soaking, for the high temperature soaking, the article is held at 1000° C. to 1800° C. in general for 3 hours or so, but to cause the production of ultrafine TiC particles of an average particle size of not more than 0.2 $\mu$m according to the present invention, the article is held at a relatively low temperature (1000 to 1200° C.) for a short time (about 1 minute). In this case, right after the target temperature is reached, the article can be dipped in water etc. for rapid cooling. On the other hand, in the case of the method of Japanese Unexamined Patent Publication (Kokai) No. 2000-144281, the TiC is produced by the self generated heat induced by the rapid temperature rise, so sophisticated control of the rise of temperature is performed to cause the production of the TiC of the predetermined particle size.

Next the method of adding the Ti master alloy into a melt obtained by melting the Al master alloy etc. is used to bring the two into contact and thereby prepare an Al alloy melt with TiC particles dispersed in it. This is cast to obtain a cast material of an Al based composite material comprised of the Al alloy matrix with TiC particles dispersed in it. The casting may be continuous casting or ingot casting.

Next, the above cast material is cold rolled to obtain the final aluminum alloy for the slide bearing. The cast material of the present invention has ultrafine TiC particles acting also as agents for reducing fineness and has fine crystal particles, so the cold rollability is extremely good. The cold rolling can be performed with a reduction ratio per pass (rate of reduction of thickness) of about 20 to 50% and a total reduction ratio of 95 to 99% or so. After rolling, it is possible to perform solution heat treatment (T4 treatment).

Even when including only ZrC particles or only $Al_2O_3$ particles as the reinforcing particles, the same method as with the above TiC master alloy is used to fabricate the ZrC master alloy or $Al_2O_3$ master alloy and one of these is added to the Al master alloy to prepare the aluminum alloy of the present invention.

When including two or more types of TiC particles, ZrC particles, and $Al_2O_3$ particles as the reinforcing particles, the same method as with the above TiC master alloy is used to fabricate two or more types of a TiC master alloy, ZrC master alloy, and $Al_2O_3$ master alloy and these are added to the Al master alloy to prepare the aluminum alloy of the present invention.

The aluminum alloy of the present invention is particularly suitable for a slide bearing. It is not however necessary to limit its application to this. It can also be used for any application where the conformability (room temperature low strength) and the high temperature fatigue strength (high temperature strength) held by the aluminum alloy of the present invention can be effectively utilized.

As a preferable embodiment of a slide bearing of the present invention, it is possible to provide a resin coating layer comprised of a heat-curing resin and a solid lubricant disclosed by the assignee in Japanese Patent Application No. 2000-246354 on the surface of a bearing body comprised of the aluminum alloy of the present invention so as to further improve the conformability and further expand the scope of application in models of vehicles etc.

The heat-curing resin of one of the ingredients of the above resin coating layer is not particularly limited so long as the conditions defined by the present invention are met. As typical examples of such a heat-curing resin, a polyimide resin, polyamide-imide resin, diisocyanate-modified resin, BPDA-modified resin, sulfone-modified resin of these resins, an epoxy resin, a phenol resin, etc. may be mentioned. In particular, a polyamide-imide resin is preferable.

A polyamide-imide resin having a tensile strength and elongation satisfying the defined ranges of the present invention can be obtained by using a molecular weight before curing of at least 20,000,000 to reduce the terminal cross-linking points and adding a polymer containing an epoxy group to speed the curing. Note that the tensile strength and elongation defined in the present invention are values measured in accordance with ASTM D-1708.

As the solid lubricant of another ingredient of the above resin coating layer, typically molybdenum disulfide ($MOS_2$), graphite, boron nitride (BN), tungsten disulfide ($WS_2$), polytetrafluoroethylene (PTFE), a fluororesin, lead (Pb), etc. may be mentioned. These may be used alone or in combinations of two or more types. Further, among the lubricants listed, in particular molybdenum disulfide, graphite, boron nitride, and tungsten disulfide are preferable.

The graphite may be either natural or artificial graphite, but artificial graphite is preferable from the viewpoint of the abrasion resistance.

These solid lubricants act to stabilize the coefficient of friction low and secure the conformability. To fully obtain these actions, the average particle size of the solid lubricant is preferably not more than 15 $\mu$m, particularly preferably 0.2 to 10 $\mu$m.

The resin coating layer is comprised of 30 to 70 vol % of the above heat-curing resin, preferably 50 to 70 vol %, and 30 to 70 vol % of the solid lubricant, preferably 30 to 50 vol % (however, the total of the two being 100 vol %).

In this formulation, the solid lubricant is strongly held in the resin coating layer containing the soft, good high temperature elongation heat-curing resin so a sufficient conformability is secured and simultaneously durability and heat resistance are secured.

The resin coating layer of the slide bearing of the present invention more preferably contains a friction adjusting agent and/or extreme pressure agent. The addition of the friction adjusting agent improves the abrasion resistance, while the addition of the extreme pressure agent improves the ability to hold the lubrication oil and thereby improves the abrasion resistance. If the two are jointly used, the effects of the two act synergistically for a further improvement of the abrasion resistance.

As the friction adjusting agent, $CrO_2$, $Fe_3O_4$, PbO, ZnO, CdO, $Al_2O_3$, $SiO_2$, $SnO_2$, or other oxides or SiC, $Si_3N_4$, or other compounds can be mentioned. If adding a friction adjusting agent, it is preferable to replace by the friction adjusting agent 0.3 to 10 vol %, particularly 0.5 to 5 vol %, of the 30 to 70 vol % of the solid lubricant.

As the extreme pressure agent, ZnS, $Ag_2S$, CuS, FeS, $FeS_2$, $Sb_3S_2$, PbS, $Bi_2S_3$, CdS, and other metal sulfides; thiurams, sulfoxides, sulfones, thiophosphinates, thiocarbonates, dithiocarbonates, alkylthiocarbamoyls, olefin sulfide, and other sulfur-containing compounds; chlorinated hydrocarbons and other organic metal compounds; molybdenum dithiophosphate, molybdenum dithiocarbimates, and other organic molybdenum compounds etc. may be mentioned.

The average particle size of the extreme pressure agent is preferably not more than 5 $\mu$m, more preferably not more than 2 $\mu$m. If adding an extreme pressure agent, it is preferable to replace with the extreme pressure agent 0.5 to 10 vol %, particularly 1 to 5 vol %, of the 30 to 70 vol % ratio of the solid lubricant.

When using both a friction adjusting agent and extreme pressure agent, the amount of addition of the two is preferably, in terms of amount of replacement, 0.3 to 10 vol %, particularly 0.5 to 5 vol %, of the 30 to 70 vol % of the solid lubricant.

EXAMPLES

Example 1

A rolled sheet of an aluminum alloy of the present invention including TiC particles as reinforcing particles was fabricated by the following procedure:

(1) Preparation of Master Alloy

A TiC master alloy and Al master alloy were prepared by the following procedure according the method disclosed in Japanese Patent No. 2734891 of the same assignee.

(Preparation of TiC Master Alloy)

1.1 g of Ti powder (made by Sumitomo Sitix, −325 mesh), 0.2 g of graphite powder (made by AESAR, −325 mesh), and 0.5 g of pure Al powder (made by Toyo Aluminum, −100 mesh) were mixed.

The obtained mixed powder was shaped by the mold compression method at a contact pressure of 4 tons to a cylindrical shape of a diameter of 11.3 mm and length of 5 mm.

The obtained compressed powder shaped article was dipped in a pure Al melt (temperature 780° C.) for 30 seconds, then taken out without becoming red hot and allowed to solidify to obtain a dipped article.

The above dipped article was heated in an Ar gas atmosphere at a heating rate of 5° C./min up to 1000° C., then the heating was stopped and the article was allowed to cool in the same atmosphere so as to obtain a TiC master alloy comprised of an Al matrix with TiC particles dispersed in it.

FIG. 1 shows a scan electron micrograph of the TiC master alloy. The average particle size of the TiC particles was 0.2 μm. The TiC particles were extremely fine in size and had a broad distribution of particle size, so were difficult to measure as to particle size by ordinary methods. Therefore, the "average particle size" was found in the following way.

That is, the metal composition of the TiC master alloy was observed by a transmission electron microscope (TEM) photograph or a scan electron microscope (SEM) photograph, the TiC particles in the field of vision were counted divided into classes of particle size of 0.1 μm increments, and the center value of the particle size class featuring the largest number of particles measured was used as the average particle size. For example, if the number of TiC particles was largest in the particle size class of 0.15 μm to 0.24 μm, the average particle size was made 0.2 μm.

(Preparation of Al Master Alloy)

Al master alloys of a composition of 4 wt % of Sn, 1.5 wt % of Cu, 0 to 2 wt % of Ca, 0.15 wt % of Cr, and the balance of Al, that is, with various different contents of Ca, were prepared by the ordinary melting method.

(2) Preparation of Cast Material

Each of the above Al master alloys was melted in a low frequency induction furnace to obtain a melt. The above TiC master alloy was charged into this melt and melted. After melting, the state was held for 20 minutes to cause the TiC particles to uniformly disperse in the melt.

Next, continuous casting was used to cast a sheet of a thickness of 18 mm at a casting temperature of 800° C. and thereby obtain a cast material comprised of an Al alloy matrix in which TiC particles were dispersed. The vol % of the TiC particles was made 1 vol % by adjusting the amount of addition of the above TiC master alloy.

(3) Preparation of Rolled Material

The above cast material was cold rolled at a total reduction rate of 91% to obtain an Al alloy rolled sheet of a thickness of 1.1 mm. The rolled sheet was annealed at 380° C. The composition of the rolled sheet was 4 wt % of Sn, 1.5 wt % of Cu, 0 to 2 wt % of Ca, 0.15 wt % of Cr, 1 vol % of TiC, and the balance of Al.

Note that as comparative examples a rolled sheet of the above composition with 0.1 wt % of Ca and no TiC and a rolled sheet of the above composition minus Ca and minus TiC were fabricated by the same procedures as above.

(4) Measurement of Hardness

Figure 2:
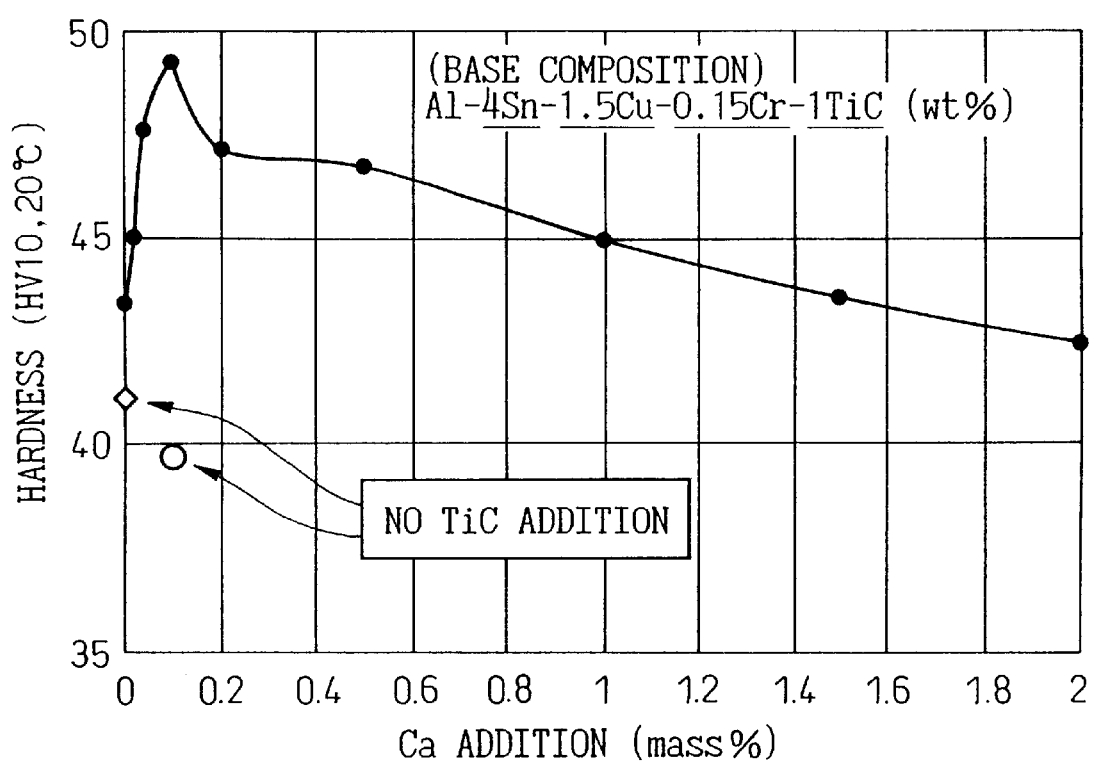
FIG. 2 is a graph of the relationship between the Ca content and hardness of an aluminum alloy reinforced by dispersion of TiC particles.

The Al alloy rolled sheets prepared in the above way were measured for hardness at room temperature (20° C.). FIG. 2 shows the results of measurement of hardness with respect to the Ca content (● plots). As comparative examples, the hardnesses in the case of no addition of TiC particles and addition of only Ca (0.1 wt %) (○ plots) and the case of no addition of TiC particles or Ca (◇ plots) are also shown.

As shown by the curve of the change in hardness connecting the ● plots in the figure, a clear increase in hardness is already recognized with 0.02 wt % of addition of Ca compared with no addition of Ca (plot at left end of curve of hardness). A peak of the maximum hardness appears at 0.1 wt % addition of Ca (fourth plot from left of same). When the amount of Ca added increases more than this, the hardness falls monotonously. With a 1.5 wt % amount of addition of Ca (second plot from right of same), substantially the same level of hardness is reached as with the case of no addition of Ca.

From these results, it is understood that addition of 0.02 to 1.5 wt % of Ca causes the hardness to increase remarkably over the hardness obtained by only TiC particles. A more remarkable increase in hardness is observed in the range of 0.02 to 1 wt % addition of Ca. A still more remarkable increase in hardness is recognized in the range of 0.05 to 0.2 wt % of addition of Ca. The above reinforcing mechanism is believed to be as follows:

That is, if not adding TiC particles and adding only Ca (white circle plots in FIG. 2), the alloy strength conversely falls from the case of not adding either Ti particles or Ca (white diamond plots of FIG. 2), so it is clear that a reinforcing mechanism based on the synergistic action of the copresence of TiC particles and Ca is at work. The following two points are considered as reasons.

First, the first point is that in general Ca has the action of causing disassociation and dissolution of the oxygen and the like derived from the impurity moisture from the surface of particles, so in the present invention as well has a cleansing action on the surface of the TiC particles, improves the dispersion in the melt, and thereby promotes the dispersion strengthening in the final aluminum alloy.

The second point is that the $CaC_2$ produced by the following reaction at the surface of the TiC particles increases the wettability of the TiC particles with the melt, improves the dispersion in the melt, and thereby promotes the dispersion strengthening in the final aluminum alloy.

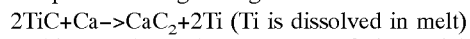

$2TiC + Ca \rightarrow CaC_2 + 2Ti$ (Ti is dissolved in melt)

In this way, due to the copresence of TiC particles and Ca, the aluminum alloy of the present invention can obtain a remarkable reinforcing action not obtainable in the case of inclusion of either of the above alone.

With a Ca content of up to 0.1 wt %, the strength is improved by the above action, but if Ca is contained in an amount over 0.1 wt %, the strength falls. The strength is believed to fall due to the excess Ca dissolving in the aluminum alloy melt and precipitating as $Al_4Ca$.

Example 2

A rolled sheet of aluminum alloy of the present invention containing ZrC particles as the reinforcing particles was fabricated by the same procedure as in Example 1. However, the ZrC master alloy taking the place of the TiC master alloy and the Al master alloy were prepared in the following manner.

(Preparation of ZrC Master Alloy)

1.52 g of Zr powder (made by Kojundo Chemical Laboratory Co., Ltd., −100 mesh), 0.2 g of graphite powder (made by AESAR, −325 mesh), and 0.5 g of pure Al powder (made by Toyo Aluminum, −100 mesh) were mixed.

The obtained mixed powder was used for the same shaping, dipping, and heat treatment as in Example 1 to obtain a ZrC master alloy.

Figure 3:
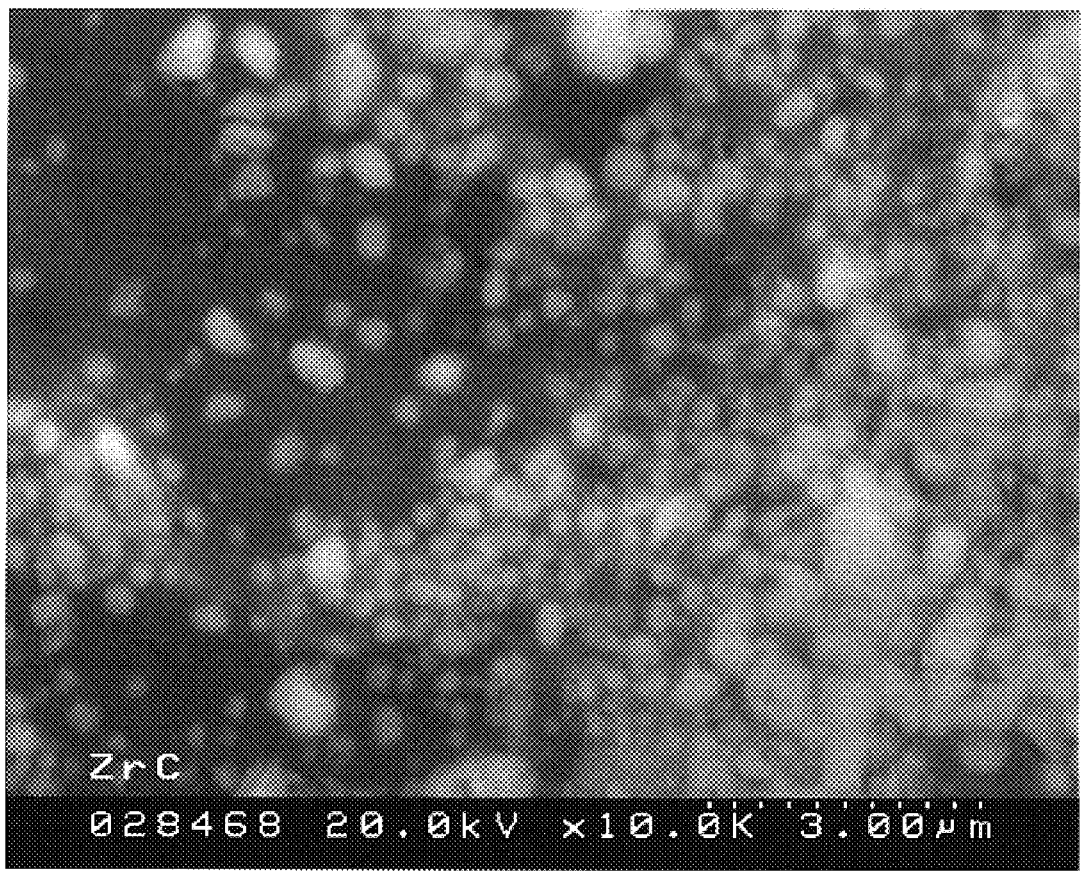
FIG. 3 is a scan electron micrograph of a ZrC master alloy in the case of in-situ production of ZrC particles for introduction into the aluminum alloy of the present invention.

FIG. 3 shows a scan electron micrograph of the ZrC master alloy. The average particle size of the ZrC particles was 0.4 μm.

(Preparation of Al Master Alloy)

An Al matrix alloy comprised of 4 wt % of Sn, 1.5 wt % of Cu, 0.1 wt % of Ca, 0.15 wt % of Cr, and the balance of Al was prepared by the usual melting method.

For the rest of the process, the same procedure was followed as in Example 1 to obtain a rolled sheet. The composition of the rolled sheet was 4 wt % of Sn, 1.5 wt % of Cu, 0.1 wt % of Ca, 0.15 wt % of Cr, 1 wt % of ZrC, and the balance of Al.

Note that as a comparative example, a rolled sheet of the above composition minus Ca was fabricated by the same procedure.

The obtained rolled sheets were measured for hardness (HV10) at room temperature (20° C.).

Example 3

A rolled sheet of aluminum alloy of the present invention containing $Al_2O_3$ particles as the reinforcing particles was fabricated by the same procedure as in Example 1. However, the $Al_2O_3$ master alloy taking the place of the TiC master alloy and the Al master alloy were prepared in the following manner.

(Preparation of $Al_2O_3$ Master Alloy)

1.4 g of $SiO_2$ powder (made by Kojundo Chemical Laboratory Co., Ltd., −230 mesh) and 21.9 g of pure Al powder (made by Toyo Aluminum, −100 mesh) were mixed.

The obtained mixed powder was used for the same shaping, dipping, and heat treatment as in Example 1 to obtain an $Al_2O_3$ master alloy.

Figure 4:
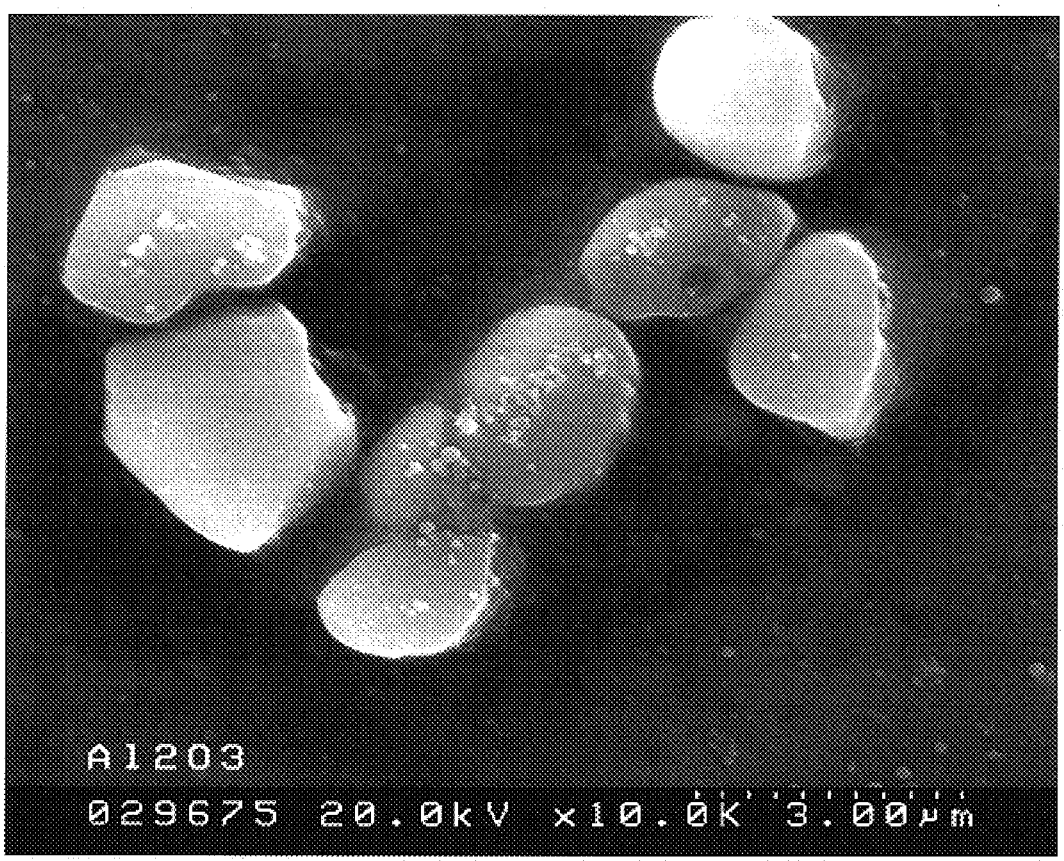
FIG. 4 is a scan electron micrograph of an $Al_2O_3$ master alloy in the case of in-situ production of $Al_2O_3$ particles for introduction into the aluminum alloy of the present invention.

FIG. 4 shows a scan electron micrograph of the $Al_2O_3$ master alloy. The average particle size of the $Al_2O_3$ particles was 3 μm.

(Preparation of Al Master Alloy)

An Al matrix allow comprised of 4 wt % of Sn, 1.5 wt % of Cu, 0.1 wt % of Ca, 0.15 wt % of Cr, and the balance of Al was prepared by the usual melting method.

For the rest of the process, the same procedure was followed as in Example 1 to obtain a rolled sheet. The composition of the rolled sheet was 4 wt % of Sn, 1.5 wt % of Cu, 0.1 wt % of Ca, 0.15 wt % of Cr, 1 wt % of $Al_2O_3$, and the balance of Al.

Note that as a comparative example, a rolled sheet of the above composition minus Ca was fabricated by the same procedure as above.

The obtained rolled sheets were measured for hardness (HV10) at room temperature (20° C.).

Table 1 shows the results of measurement of the hardness of rolled sheets fabricated in Examples 2 and 3, the results of measurement of hardness in the case of addition of 0.1 wt % of Ca in the rolled sheet fabricated in Example 1 (peak hardness), and the results of measurement of hardness in the case of no reinforcing particles and no addition of Ca in a rolled sheet fabricated as a comparative example.

TABLE 1

Results of Measurement of Room Temperature Hardness (20° C., HV10)

| Reinforcing particles | None | TiC | ZrC | $Al_2O_3$ |
|---|---|---|---|---|
| No Ca | 41.2 | 43.4 | 45.5 | 46.2 |
| Ca | 39.6 | 49.2 | 50.7 | 49.5 |
| Alloy composition | *1 | *2 | *3 | *4 |

*1 Al—4Sn—1.5Cu—0.15Cr—(0 or 0.1)Ca
*2 Al—4Sn—1.5Cu—0.15Cr—(0 or 0.1)Ca—1TiC
*3 Al—4Sn—1.5Cu—0.15Cr—(0 or 0.1)Ca—1ZrC
*4 Al—4Sn—1.5Cu—0.15Cr—(0 or 0.1)Ca—1$Al_2O_3$ (Contents of ingredients are by wt %. However, vol % for reinforcing particles.)

As shown in Table 1, not matter which of TiC, ZrC, and $Al_2O_3$ is used as the reinforcing particles, by adding 0.1 wt % of Ca, the hardness is greatly increased compared with when not adding Ca. In the case of no reinforcing particles, the addition of Ca rather causes the hardness to drop compared with no addition of Ca, so it is believed that the copresence of reinforcing particles and Ca causes the above-mentioned reinforcing mechanism to act and increases the hardness synergistically.

What was measured in the above examples was the room temperature hardness, but the present inventors already confirmed that in an aluminum alloy reinforced by dispersion of TiC particles in the same way as in Example 1, the room temperature hardness is maintained substantially as it is up to about 100° C. It is believed that the room temperature hardness is maintained as it is up to a high temperature of about 100° C. even in the aluminum alloys of the above examples.

Therefore, the above results show that it is possible to raise the high temperature strength without increasing the amount of reinforcing particles, that is, show that it is possible to raise the high temperature strength without causing deterioration of the conformability due to the increased amount of reinforcing particles.

Finally, it was confirmed from endurance tests that a slide bearing comprised of the aluminum alloy of the present invention given a resin coating disclosed in the above-mentioned Japanese Patent Application No. 2000-246354 of the same assignee could be used not only for a gasoline engine, but even for a diesel engine to which aluminum alloy reinforced by dispersion of reinforcing particles of TiC, ZrC, $Al_2O_3$, etc. could not be applied in the past.

Summarizing the effects of the present invention, according to the present invention, there are provided an aluminum alloy which is able to use not only expensive TiC particles, but also inexpensive dispersed reinforcing particles and which is further raised in high temperature strength without requiring an increase in dispersed reinforcing particles and slide bearings using this alloy.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2002-59252, filed on Mar. 5, 2002, the disclosure of which is expressly incorporated herein by reference in its entirety.

What is claimed is:

1. An aluminum alloy comprised of:

Sn: 2 to 20 wt %,

Cu: 0.1 to 3 wt %,

Ca: 0.02 to 1.5 wt %, at least one element selected from the group comprised of Mg, Cr, Zr, Mn, V, Ni, and Fe: not more than 2 wt % in total, at least one type of reinforcing particle selected from the group comprised of tic particles, ZrC particles, and $Al_2O_3$ particles: 0.1 to 5 vol % in total, and the balance of al and unavoidable impurities.

2. A slide bearing comprised of the aluminum alloy as set forth in claim 1.

3. A slide bearing comprised of a bearing body made of the aluminum alloy as set forth in claim 1 provided on its surface with a resin coating layer, wherein the resin coating layer contains 70 to 30 vol % of a soft, good high temperature elongation heat-curing resin having properties at 25° C. of a tensile strength of 70 to 110 MPa and an elongation of 7 to 20% and properties at 200° C. of a tensile strength of at least 15 MPa and an elongation of at least 20%, and 30 to 70 vol % of a solid lubricant wherein the total of said heat curing resin and said solid lubricant is 100 vol %, and wherein the Vicker's hardness Hv of the resin coating layer is not more than 20.

* * * * *